Aug. 19, 1952     J. A. KANUCH     2,607,599
THREE-WAY VALVE
Filed Nov. 12, 1949
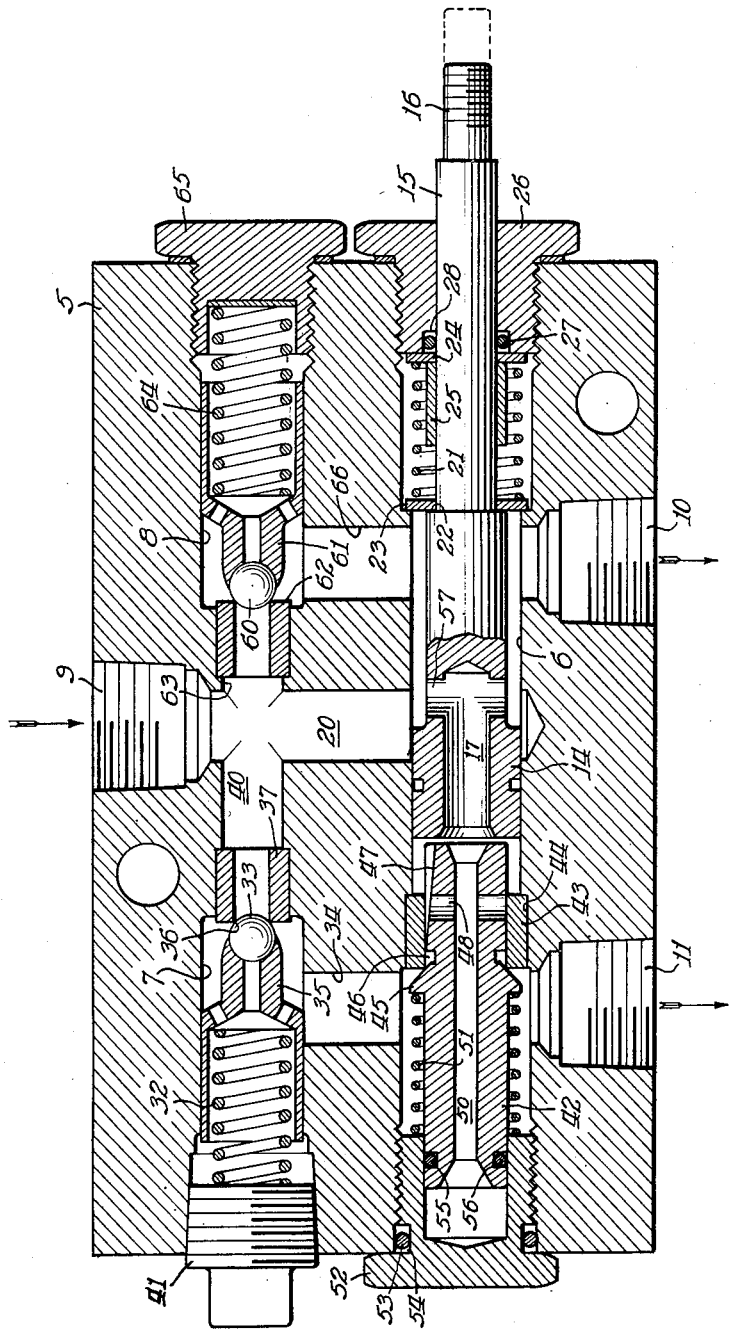
Inventor:
John A. Kanuch
By: Edward C. Fitzgerald Patented Aug. 19, 1952

2,607,599

UNITED STATES PATENT OFFICE 2,607,599

THREE-WAY VALVE

John A. Kanuch, South Euclid, Ohio, assignor to Borg-Warner Corporation, Chicago, Ill., a corporation of Illinois Application November 12, 1949, Serial No. 126,873

9 Claims. (Cl. 277—20)

This invention relates to a fluid pressure valve, and more particularly to a three-way valve with provision for metering or modulating return flow.

In the operation of heavy, hydraulically actuated apparatus as, for example, in operating a hydraulically raised and lowered plow or other similar equipment wherein hydraulic pressure is employed to move the device in one direction against gravity while return of the device is effected by gravity upon the hydraulic pressure being removed, it is sometimes desirable to provide a simple valve whereby in one position of the valve pressure may be applied to actuate the hydraulic mechanism, while in a second or neutral position of the valve, the actuating pressure is maintained, and in a third position of the valve return flow is permitted to allow lowering of the hydraulic mechanism by gravity. It is further desirable to provide means in such a valve for controlling the rate of return flow, that is, for metering or modulating the return, whereby the speed of lowering of the device may be closely controlled.

An object of the present invention is to provide a simple and efficient three-way valve with provision for metering or modulating return flow.

In accordance with one embodiment of this invention, a three-way valve may comprise a plunger type valve which in its neutral or first position permits pressure applied to the valve from a suitable pressure generator to return to the sump. The plunger valve is shiftable to a second position wherein pressure is prevented from flowing to the sump and is applied through a check valve to the actuating device. Upon return of the plunger valve to the neutral position, the check valve prevents return flow and the hydraulically actuated device is maintained in raised position. In a third position of the plunger valve, while pressure applied from the pressure generator to the valve is returned to the sump, pressure from the hydraulically actuated device is also permitted to return to the sump, the rate of pressure return being metered to the sump in accordance with the position of a tapered metering surface provided in the valve. The three-way valve also incorporates a maximum pressure relief valve.

Other objects and advantages of the present invention will be apparent from the following detailed description taken in conjunction with the drawing wherein the single figure is a sectional view showing the three-way valve mechanism of this invention.

Referring now to the drawing, it will be seen that the three-way valve of this invention comprises a large, generally rectangular valve housing block 5 having a plunger valve chamber 6 extending horizontally across the lower portion thereof. Above the plunger valve chamber 6 and on the left side of the block 5 a check valve chamber 7 is provided in the housing block 5 and on the right side of the housing 5 above the plunger valve chamber there is provided a relief valve chamber 8. Inlet pressure is supplied to inlet port 9 from a suitable pressure generator (not shown) and pressure may be returned to the sump, as will be hereinafter explained, through a first outlet port 10 which may be connected to a suitable sump return line. Pressure may be supplied from the pressure generator through the valve to a suitable pressure utilization device or hydraulic motor through a second discharge port 11 formed in housing 5 at the lower left side thereof.

Control of the operation of this three-way valve is effected by a longitudinally movable plunger valve 14 journalled in the chamber 6. The stem 15 of valve 14 extends to the right and terminates in a threaded end portion 16 which may be secured to any suitable actuating means as, for example, a lever. More particularly, the plunger valve 14 comprises a short valve body having an axially extending passage 17 formed therein, the length of the valve body being selected so that when the plunger valve is shifted sufficiently to the right, the lower end of a pressure passage 20, formed in housing block 5 and connecting at its upper end to inlet port 9, is sealed.

In shifting valve 14 to the right to seal the pressure passage 20, the valve must be moved against the compression force of a spring 21 disposed about the mid portion of valve stem 15, which mid portion as may be seen is reduced in diameter to define at its left end a shoulder 22 against which a spring retainer ring 23 is positioned, the left end of spring 21 bearing against the right side of this ring. The right end of spring 21 bears against a second retainer ring 24 mounted at the right end of a short sleeve 25 and retained in position by a retaining cap 26 threaded into the right end of chamber 6. A sealing ring 27 is disposed in a suitably formed annular recess 28 provided in the left inner portion of retainer cap 26 and serves to prevent escape of fluid pressure axially of the stem 15.

In the position of the plunger valve 14 which is illustrated, pressure supplied to the inlet port 9 passes through passage 20 and about the periphery of the stem portion lying between shoulder 22 and the right end of valve body 14, returning through port 10 to the sump. This left portion of the stem 15 is of substantially less outer diameter than the inner diameter of the adjacent portion of chamber 6. However, by shifting valve 14 to the right to close the lower end of passage 20, the escape of pressure through sump return port 10 is terminated and pressure then builds up inside the valve housing.

Upon the pressure inside the valve reaching a predetermined, usually relatively low, value established by the compression of a check valve spring 32 disposed in check valve chamber 7, ball check valve 33 may be caused to open, permitting flow of pressure through the chamber 7 to a short, vertically extending passage 34 formed in the left portion of valve housing 5. Passage 34 communicates at its lower end with the left portion of plunger valve chamber 6 and a passage is afforded therethrough, as will be explained hereinafter, to the pressure outlet passage 11, which may be connected to a suitable pressure responsive device.

More particularly, the check valve 33 is supported in a valve guide 35 slidably journalled in check valve chamber 7 and arranged to maintain the ball valve 33 in alignment with a valve seat 36 provided at the left end of a sleeve insert 37 mounted in the slightly enlarged, left end portion of a short, transversely extending passage 40 formed in housing block 5. Passage 40 connects at its right end to the upper end of passage 20. A threaded retainer cap 41 bears against the left end of spring 32 and holds the same securely in position, while permitting adjustment of spring 32.

So long as the valve 14 is shifted to the right to close the lower end of passage 20 and the pressure in the valve exceeds the compression force exerted by spring 32 on check valve 33, pressure will be applied through the check valve to the outlet port 11. When the valve 14 is released, however, it will be shifted to the left to the position illustrated in the drawing by the coiled compression spring 21, thus terminating the delivery of pressure fluid through the outlet 11 by permitting fluid supplied to the inlet 9 to return to the sump through outlet 10. Where the device actuated by pressure supplied from the outlet 11 is of the type which upon cessation of pressure delivery thereto produces an immediate return pressure, as for example, a plow which has been raised by hydraulic pressure, return flow of pressure to the sump will be prevented by the ball check valve 33 which will immediately seat upon the valve 14 being moved to the left and pressure in the chamber 20 being reduced.

Return of pressure to the sump through the chamber 6 is prevented by a metering valve 42 disposed in the left portion of chamber 6 and arranged to seat on the left end of a sleeve insert 43 mounted in a suitably recessed portion 44 of chamber 6, the left end of insert 43 providing a valve seat and terminating adjacent the right side wall of vertical passage 34, as viewed in the drawing. The metering valve 42 comprises a hollow, generally cylindrical body having a flange 45 formed about the periphery of the mid portion thereof, the right side of the flange being beveled to form a valve rim suitable for seating engagement with respect to the valve seat provided at the left end of sleeve insert 43. Immediately to the right of flange 45 there is provided in valve body 42 an annular groove 46 to facilitate manufacture of the metering valve and insure the provision of a close seat.

Starting at the right side of groove 46, there is provided on the upper portion of this metering valve a tapered metering surface 47, the surface 47 tapering inwardly toward the right end of the metering valve. Substantially in the middle of the tapered portion of the metering valve, there are provided short, radially extending passages 48 which communicate at their inner ends with an internal chamber 50 defined by the hollow valve body 42.

The metering valve 42 is normally held in the position illustrated, that is, with the flanged valve member 45 seated on the valve seat 43 by a coiled compression spring 51 disposed about the left portion of the valve body and having its right end bearing against the left side of flange 45. The left end of spring 51 bears against the right end of a retaining cap 52 threaded into the left end of chamber 6, and a sealing ring 53 is disposed in an annular groove 54 formed about the periphery of the left portion of cap 52 to prevent escape of fluid between the cap and the chamber wall. Similarly, a sealing ring 55 is positioned in an annular groove 56 formed adjacent the left end of metering valve 42 to control escape of fluid pressure to the left axially of the valve.

When the plunger valve 14 is shifted to the left, that is, to the third position hereinbefore referred to, the metering valve, the right end of which abuts the left end of valve 14, is also shifted to the left. Initially, the valve flanged portion 45 is unseated, but continued movement causes the metering surface 47 to be exposed. The further the metering valve 42 is shifted to the left, the wider the opening provided by the metering surface 47 as will be readily understood.

Upon the metering surface 47 being exposed, a return passage from the discharge passage 11 is provided through the radial passages 48 to the chamber 50 which communicates at its right end with the chamber 17 formed in the interior of valve 14. It will be noted that, at the right end of chamber 17, there are provided further short, radial passages 57 which communicate at their outer sides with the annular chamber defined by the periphery of the left portion of the stem 15 and the adjacent inner wall of chamber 6. This chamber communicates directly with the sump return port 10. Because the chamber 50 in the valve 42 is in constant communication with the portion of chamber 6 at the left of valve 42 and at the same time with the sump return 10, movement of valve 42 is not hindered by hydraulic locking.

It will be evident from the foregoing that by controlling the position of valve 14, it is possible either (a) to divert pressure supplied through inlet 9 to the sump, or (b) to cause pressure to be applied through the discharge port 11 to an actuating device, or (c) to permit return of pressure at a rate controlled by the leftward position of the valve 14 and particularly of the metering surface 47.

In order to control the maximum pressure, and this is particularly important when the shiftable plunger valve 14 is shifted to the position where the passage 20 is closed, a relief valve is provided in this valve assembly. The relief valve comprises a ball valve 60 carried by a guide 61 journalled in relief valve chamber 8 and the ball valve 60 is adapted to seat against the right end of a sleeve insert 62 mounted in a short transverse passage 63, which communicates at its left end with the upper portion of passage 20. The ball valve 60 is normally held in closed or seated position by a heavy, coiled compression spring 64 disposed in the right portion of chamber 8 and having its left end bearing against the inner side of guide 61. The right end of spring 64 bears against a threaded retaining cap 65 which is threaded into the right end portion of relief valve chamber 8. Upon the pressure exceeding a predetermined maximum value, relief valve 60 will open and permit passage of fluid under pressure through the left portion of relief valve chamber 8 to a downwardly extending short passage 66, which communicates at its lower end with the plunger valve chamber 6. This portion of the chamber is always in communication with the sump return port 10, as will be readily evident from the drawing, and thus an emergency relief passage is always provided.

Where herein the various parts of this invention have been referred to as being located in a right or a left, or an upper or a lower, position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. A three-way valve including a housing having an inlet port, a sump return port and a utilization port formed therein, a check valve disposed in said housing between said inlet port and said utilization port, a pressure relief valve in said housing between the inlet port and the return port, a metering valve between the utilization port and the return port and a shiftable valve effective in a first position to permit inlet pressure to pass directly from the inlet port to the return port, said shiftable valve being shiftable to a second position blocking direct flow to the return port to cause pressure to be applied through said check valve to the utilization port, and said shiftable valve being shiftable to a third position to open said metering valve to control the rate of flow of pressure from said utilization port to said return port.

2. A three-way valve including a housing having an inlet port, an outlet port and a utilization port formed therein, a check valve disposed in said housing between said inlet port and said utilization port, a pressure relief valve in said housing between the inlet port and the return port, a metering valve between the utilization port and the return port and a shiftable valve effective in a first position to permit inlet pressure to pass directly from the inlet port to the return port, said shiftable valve being shiftable to a second position blocking direct flow to the return port to cause pressure to be applied through said check valve to the utilization port, and said shiftable valve being shiftable to a third position to open said metering valve to control the rate of flow of pressure from said utilization port to said return port, said shiftable valve in said third position providing again a direct path for pressure from said inlet port to said return port.

3. A three-way valve comprising a housing, said housing having an inlet port, a return port and a utilization port formed therein and passages interconnecting said ports, a check valve disposed in the passage connecting the inlet port and the utilization port and permitting flow of fluid under pressure from the inlet port to the utilization port, a normally closed metering valve connected between the utilization port and the return port, and a control valve shiftable to a first position to permit inlet pressure to pass from the inlet port to the return port, shiftable to a second position to prevent inlet pressure from passing from the inlet port to the return port, and shiftable to a third position to move the metering valve to open position.

4. A three-way valve comprising a housing, said housing having an inlet port, a return port and a utilization port formed therein and passages interconnecting said ports, a check valve disposed in the passage connecting the inlet port and the utilization port and permitting flow of fluid under pressure from the inlet port to the utilization port, a normally closed metering valve connected between the utilization port and the return port, and a control valve shiftable to a first position to permit inlet pressure to pass from the inlet port to the return port, shiftable to a second position to prevent inlet pressure from passing from the inlet port to the return port, and shiftable to a third position to move the metering valve to open position, said control valve when shifted to said third position again permitting passage of fluid under pressure from the said inlet port to said return port.

5. A three-way valve comprising a housing, said housing having an inlet port, a return port, a utilization port and passages interconnecting said port formed therein, a check valve disposed in the passage connecting the inlet port and the utilization port and permitting flow of fluid under pressure from the inlet port to the utilization port, a normally closed metering valve connected between the utilization port and the return port, a control valve shiftable to a first position to permit inlet pressure to pass from the inlet port to the return port, shiftable to a second position to prevent inlet pressure from passing from the inlet port to the return port, and shiftable to a third position to move the metering valve to open position, a tapered metering surface on said metering valve, and a valve seat cooperating with said surface to define a variable area orifice, the size of said orifice being dependent on the amount said metering valve is moved by said control valve.

6. A three-way valve comprising a housing, said housing having an inlet port, a return port, a utilization port and passages interconnecting said ports formed therein, a check valve disposed in the passage connecting the inlet port and the utilization port and permitting flow of fluid under pressure from the inlet port to the utilization port, a normally closed metering valve connected between the utilization port and the return port, a control valve shiftable to a first position to permit inlet pressure to pass from the inlet port to the return port, shiftable to a second position to prevent inlet pressure from passing from the inlet port to the return port, and shiftable to a third position to move the metering valve to open position, said control valve when shifted to said third position again permitting passage of fluid under pressure from said inlet port to said return port, a tapered metering surface on said metering valve and a valve seat cooperating therewith to define a variable area orifice, the size of said orifice being dependent on the amount said metering valve is moved by said control valve.

7. A three-way valve comprising a housing, said housing having an inlet port, a return port, a utilization port and passages interconnecting said ports formed therein, a check valve disposed in the passage connecting the inlet port and the utilization port and permitting flow of fluid under pressure from the inlet port to the utilization port, a normally closed metering valve connected between the utilization port and the return port, a control valve shiftable to a first position to permit inlet pressure to pass from the inlet port to the return port, shiftable to a second position to prevent inlet pressure from passing from the inlet port to the return port, and shiftable to a third position to move the metering valve to open position, a tapered metering surface on said metering valve, and a valve seat cooperating with said tapered surface to define a variable area orifice, the size of said orifice being dependent on the amount said metering valve is moved by said control valve, said control valve having a passage formed therein communicating at one end with said return port and at the other end with the passage in which the metering valve is disposed, said metering valve having an axially extending aperture communicating at one end with the adjacent end of said control valve passage and at its other end with the tapered metering surface.

8. A three-way valve comprising a housing, said housing having an inlet port, a return port, a utilization port and passages interconnecting said ports formed therein, a check valve disposed in the passage connecting the inlet port and the utilization port and permitting flow of fluid under pressure from the inlet port to the utilization port, a normally closed metering valve connected between the utilization port and the return port, a control valve shiftable to a first position to permit inlet pressure to pass from the inlet port to the return port, shiftable to a second position to prevent inlet pressure from passing from the inlet port to the return port, and shiftable to a third position to move the metering valve to open position, said control valve when shifted to said third position again permitting passage of fluid under pressure from said inlet port to said return port, and a maximum pressure relief valve providing a bypass path from said inlet port to said return port in the event the pressure in said three-way valve exceeds a predetermined value.

9. A three-way valve comprising a housing having an inlet port, a sump return port and a utilization port formed therein and passages interconnecting said ports, check valve defining means permitting flow of fluid under pressure from the inlet port to the utilization port, a metering valve connected between the utilization port and the return port, and a control valve shiftable to a first position to permit inlet pressure to pass from the inlet port to the return port, shiftable to a second position to prevent inlet pressure from passing from the inlet port to the return port and shiftable to a third position to move the metering valve to open position.

JOHN A. KANUCH.

REFERENCES CITED

The following references are of record in the file of this patent:

UNITED STATES PATENTS

| Number | Name | Date |
|---|---|---|
| 1,315,387 | Murphy | Sept. 9, 1919 |
| 2,362,945 | Stephens | Nov. 14, 1944 |